United States Patent [19]
Kataoka

[11] Patent Number: 4,667,534
[45] Date of Patent: May 26, 1987

[54] LIMITED SLIP DIFFERENTIAL GEAR MECHANISM

[75] Inventor: Fumio Kataoka, Ashikaga, Japan

[73] Assignee: Tochigi-Fuji Sangyo Kabushiki Kaisha, Tochigi, Japan

[21] Appl. No.: 788,970

[22] Filed: Oct. 18, 1985

[51] Int. Cl.$^4$ ............................. F16H 1; F16H 44; F16D 13/64; F16D 13/74

[52] U.S. Cl. ........................... 74/711; 74/713; 192/70.12; 192/70.14; 192/107 R; 192/113 B

[58] Field of Search ............... 74/711, 713; 192/70.12, 192/70.14, 57, 107 R, 113 B; 188/264 E, 71.6

[56] References Cited

U.S. PATENT DOCUMENTS

| | | | |
|---|---|---|---|
| 1,132,958 | 3/1915 | Miller | 192/70.12 |
| 2,779,175 | 1/1957 | Le Hew | 192/113 B X |
| 2,965,205 | 12/1960 | Winchell | 192/107 R X |
| 3,073,424 | 1/1963 | Russell | 192/113 B |
| 3,313,180 | 4/1967 | Balfour et al. | 74/711 |
| 3,463,281 | 8/1969 | Aschauer | 192/57 |
| 3,534,842 | 10/1970 | Davison, Jr. | 192/113 B |
| 3,648,545 | 3/1972 | Clancey | 192/113 B X |
| 3,896,684 | 7/1975 | Duer | 74/711 |

Primary Examiner—Allan D. Herrmann
Attorney, Agent, or Firm—Wenderoth, Lind & Ponack

[57] ABSTRACT

A limited slip differential gear mechanism includes a pinion shaft rotating integrally with a differential gear casing, pinion gears attached rotatably to the pinion shaft, side gears engaged with the pinion gears and splined to axles, and a plurality of first and second clutch plates alternately disposed between the side gears and the differential gear casing. A lug portion provided on the inner surface of each first clutch plate engages with the outer surface of the side gear, while a lug portion provided on the outer surface of each second clutch plate engages with the inner surface of the differential gear casing. Concave portions or projections are formed between the first and second plates in contact with each other to define gaps for retaining lubricating oil.

5 Claims, 21 Drawing Figures

LIMITED SLIP DIFFERENTIAL GEAR MECHANISM

BACKGROUND OF THE INVENTION

1. Field of the Invention

This invention relates to a limited slip differential gear mechanism, and more particularly to a limited slip differential gear mechanism by which maintenance of lubricating oil in a clearance between clutch plates as well as capacity for supplying lubricating oil to the clearance between the clutch plates are increased, whereby vibration and noise due to the stickslip phenomenon caused by friction between the two surfaces of the clutch plates being in contact with each other are prevented.

2. Related Art Statement

Figure 1A:
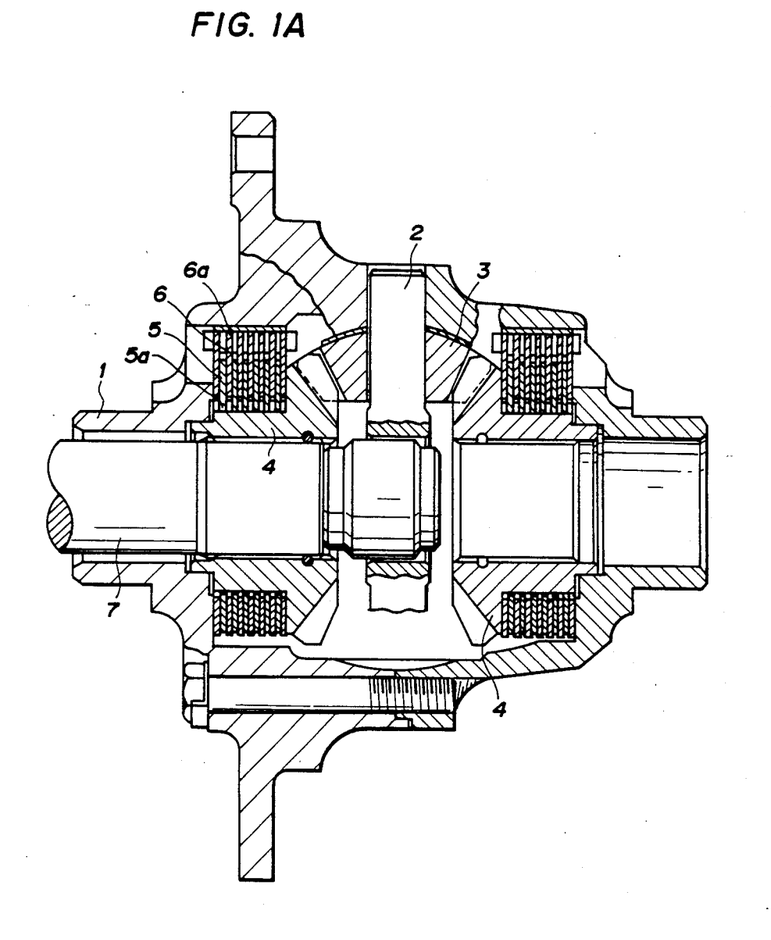
FIG. 1A is an explanatory sectional view of a limited slip differential gear mechanism.

FIG. 1A shows an example of a limited slip differential gear mechanism comprising a differential gear casing 1 which is driven by a driving pinion (not shown) through a ring gear, a pinion shaft 2 rotating together with the differential gear casing 1, a pinion gear 3 attached rotatably to the pinion shaft 2, side gears 4 spline-connected to axles 7, and pluralities of first and second clutch plates 5 and 6 positioned between the differential gear casing 1 and the side gears 4 (A lug portion 5a of each first clutch plate 5 engages with the outer circumference of the side gear 4, while a lug portion 6a of each second clutch plate 6 engages with the differential gear casing 1). Furthermore there have been proposed heretofore such clutch plates as shown, for example, in FIGS. 1B, 1C, and 1D which have spiral or radial oil grooves 8 defined on the clutch plates wherein a differential gear carrier (not shown) is provided outside the differential gear casing 1 to maintain the entire limited slip differential gear mechanism in an enveloping state. Lubricating oil is enclosed in the differential gear carrier, and the interior and exterior of the limited slip differential gear mechanism are communicated with each other through openings, clearances or the like defined in the differential gear casing 1 so that the lubricating oil passes freely to and from the limited slip differential gear mechanism.

In the above construction, when the torque introduced from the drive pinion (not shown) through the ring gear is transmitted to the differential gear casing 1, the pinion shaft 2 fitted thereto is also rotated by means of the turning force acting on the differential gear casing 1, and such turning force is transmitted to the pinion gears 3 fitted to the pinion shaft 2, the side gears 4 meshed with the pinion gears 3, and the clutch plates 5 and 6, respectively. As a result, the clutch plates 5 and 6 function as a by-pass for torque to transmit the same in a manner such that much more torque is transferred to the axles 7 on the lower speed side by an amount corresponding to the torque capacity, whereby tractive ability, running stability and the like can be improved.

In limited slip differential gear mechanisms, however, the clutch plates 5 and 6 are disposed between the side gear 4 and the differential gear casing 1, and the surface of each clutch plate is flat-finished, so that it becomes rather difficult to supply lubricating oil into a gap between the sliding surfaces, and this results easily in a shortage of a lubrication film therebetween. Thus, wear occurs at in the sliding surfaces to lower the performance and at the same time to generate the stick-slip phenomenon due to friction between the surfaces of the clutch plates 5 and 6. Thereby, there is the danger that tyres and the axle 7 resonate as a spring system, whereby vibration of the clutch plates 5 and 6 is transmitted to the differential gear casing 1 and the like by repeating accumulation and release of torque, and thus generating an abnormal sound. In this connection, there is a problem that such abnormal sound is undesirable to a passenger.

The term "stick-slip phenomenon" used herein means the phenomenon which appears due to static friction in the case of contact between two surfaces and dynamic friction in the case of sliding between two surfaces, when considered friction in face to face relation, and such stick-slip phenomenon produces vibration.

Figure 1B:
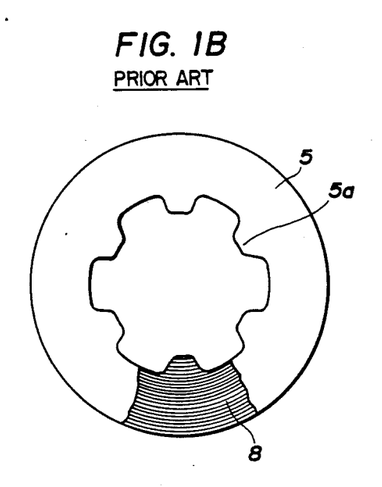
FIGS. 1B and 1C are explanatory elevational views showing conventional clutch plates.
Figure 1C:
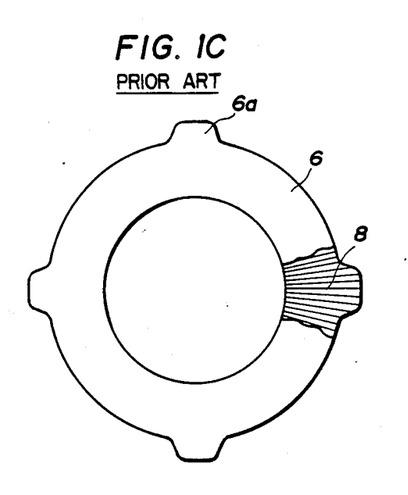
Figure 1D:
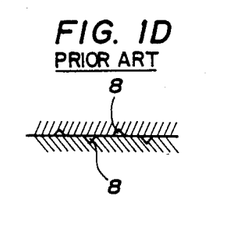
FIG. 1D is an enlarged sectional view showing oil grooves.

In such a limited slip differential gear mechanism wherein any clutch plate shown in FIG. 1A, 1B, or 1C is used, the lubricating oil which is introduced into the oil groove 8, upon stopping the limited slip differential gear mechanism, forms a film of oil extending on the surface of the clutch plates by means of slidable contact between the two clutch plates upon starting application of pressure to the clutch plates when action of the limited slip differential gear mechanism is commenced. But, when the action of mechanism continues continues the action thereof, neither fresh oil is not supplied to the oil groove 8, and the lubricating oil in the oil groove 8 as well as such lubricating oil which will form a film rapidly flow out and scatter by means of centrifugal force, so that there is the possibility that the above-mentioned stick-slip phenomenon appears.

OBJECTS AND SUMMARY OF THE INVENTION

Accordingly, the first object of the present invention is to provide a limited slip differential gear mechanism in which vibration due to the stick-slip phenomenon which is caused by friction between two surfaces of clutch plates with pressure therebetween is prevented.

The second object of the present invention is to provide a limited slip differential gear mechanism in which the capacity for retention of lubricating oil between the clutch plates is increased.

The third object of the present invention is to provide a limited slip differential gear mechanism in which the capacity for supplying lubricating oil to gaps between the clutch plates is elevated.

These objects and advantages of the present invention are realized by a limited slip differential gear mechanism including a pinion shaft rotating integrally with a differential gear casing, pinion gears attached rotatably to the pinion shaft, side gears engaged with the pinion gears and splined to axles, and a plurality of first and second clutch plates alternately disposed between the side gears and the differential gear casing a lug portion provided on the inner surface of each first clutch plate engages with the outer surface of the side gear, while a lug portion provided on the outer surface of each second clutch plate engages with the inner surface of the differential gear casing. Gaps for retaining lubricating oil are formed between the first and second clutch plates which are in contact with each other, whereby the capacity for retention of the lubricating oil as well as the capacity for supplying the lubricating oil to the contacting surfaces between the two clutch plates are increased, and also a film of the lubricating oil is formed therebetween.

BRIEF DESCRIPTION OF THE DRAWINGS

Embodiments of the invention will now be described, by way of examples with reference to the accompanying drawings, in which.

DETAILED DESCRIPTION OF PREFERRED EMBODIMENTS

Figure 2A:
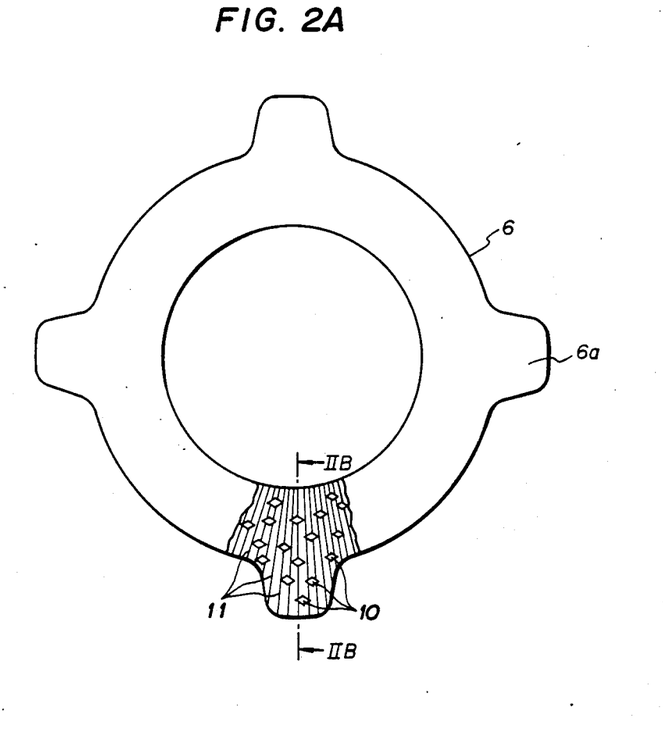
FIG. 2A is an explanatory elevational view of a clutch plate in an embodiment of the limited slip differential gear mechanism according to the present invention.
Figure 2B:
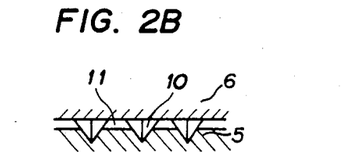
FIG. 2B is an enlarged sectional view showing concave portions taken along line IIB—IIB of FIG. 2A.

The limited slip differential gear mechanism according to the present invention will be described hereinbelow by referring to FIGS. 2A and 2B together with FIG. 1A. FIGS. 2A and 2B are explanatory views showing a clutch plate in a first embodiment of the limited slip differential gear mechanism according to the present invention wherein concave recesses or portions 10 for increasing the capacity for retention of lubricating oil are defined over the entire of either of opposite surfaces of clutch plate 5 or clutch plate 6, between which are formed gaps for retaining lubricating oil. Also, oil grooves 11 are radially defined so as to intersect with concave portions 10. The concave portion 10 is defined as shown, for example, in FIG. 2B and it is a pyramidal cavity defined by planar surfaces converging at an apex and having larger depth and width than those of the oil groove 11 as well as increased capacity. Each respective concave portion 10 intersects with one or two, or more of the oil grooves 11. Since the oil grooves 11 extend from a side edge portion of the inner diameter to that of the outer diameter in a clutch plate, the concave portions 10 are in communication with both the inner and outer diameter sides of the clutch plate through the oil grooves 11. In this case, the profile of the concave portion 10 is not limited to that shown in FIGS. 2A and 2B, but any fixed or indeterminate form as shown, for example, in FIGS. 4A -4E may also be used.

Figure 2C:
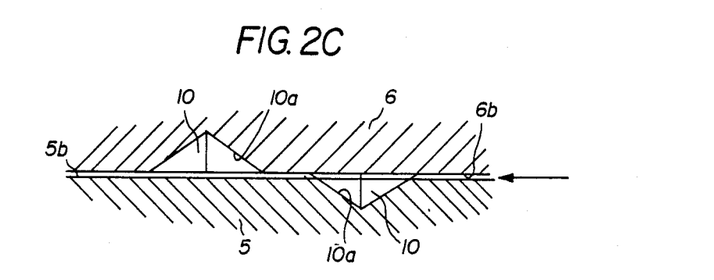
FIG. 2C is a view similar to FIG. 2B, but showing concave portions in contacting surfaces of both plates.
Figure 3A:
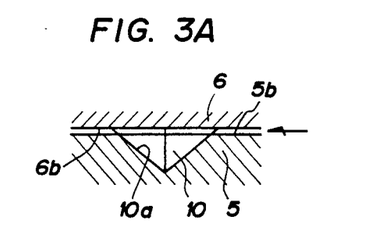
FIGS. 3A and 3B are explanatory views illustrating the principle for supplying the lubricating oil in a concave portion to the clutch plates.
Figure 3B:
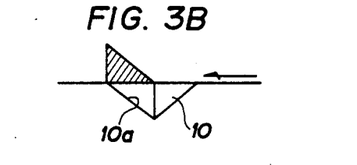
Figure 3C:
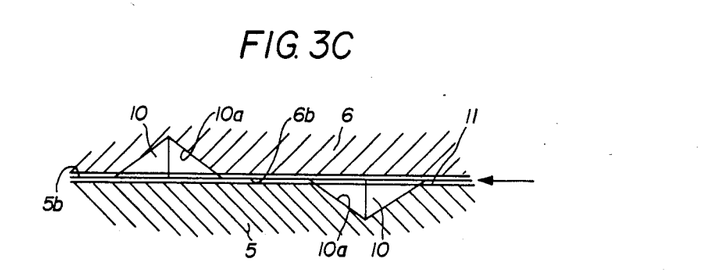
FIG. 3C is a view similar to FIG. 3A, but showing concave portions in contacting surfaces of both plates

Furthermore the concave portions 10 as well as the oil grooves 11 may defined on either or both of the surfaces of the clutch plates 5 and 6 which are in contact with each other, e.g. as shown in FIGS. 2c and 3c.

In the above construction, the lower part of the limited slip differential gear mechanism is immersed in lubricating oil in its differential gear carrier at the time when the limited slip differential gear mechanism is not operated, so that such lubricating oil enters into the clearance between the clutch plates 5 and 6 through openings in its differential gear casing as well as gaps defined between the respective parts of the mechanism, and the lubricating oil is supplied to the surfaces of the clutch plates and into the concave portions 10 as well as the oil grooves 11. On the other hand, when the limited slip differential gear mechanism is operated, centrifugal force is produced and face to face sliding motion appears in the clearance between the clutch plates 5 and 6, so that such lubricating oil which will form a film on the clutch plates has such tendency to flow out and be scattered. However, the lubricating oil with which the concave portions 10 and the oil grooves 11 are filled flows towards the outer circumference of the clutch plates, while oil is gradually supplied and replenished into them when the clutch plates 5 and 6 relatively slide, so that the film of lubricating oil is maintained. FIGS. 3A and 3B are views illustrating the principle of supply of the lubricating oil in the concave portions 10 to the surfaces of the clutch plates wherein since the concave portion 10 defined on the clutch plate 5 has a pyramidal profile, such lubricating oil advancing in the direction of the arrow through the clearance defined between the surfaces 5b and 6b of the clutch plates 5 and 6 flows into the concave portion 10, whereby pressure of the lubricating oil in the concave portion 10 is elevated as illustrated in the shaded portion of the pressure distribution graph shown in FIG. 3B. The lubricating oil of elevated pressure in the concave portion ascends along a slope surface 10a, and as a result the lubricating oil is pushed into the clearance between the surfaces of the clutch plates 5 and 6. A film of the lubricating oil on the clutch plate surface is maintained by means of the replenishing action of lubricating oil from the concave portion 10 to the clutch plate surfaces as described above. Particularly, when the concave portion is defined so as to have a pyramidal profile, the lubricating oil with the highest pressure can be concentrated at the top of such pyramidal concave portion so that the capacity for supplying lubricating oil is increased. Furthermore, even if such concave portion has a profile of any fixed or indeterminate form including those illustrated in FIGS. 4A-4E, the same effects as those mentioned above can be expected though there is a difference more or less, as long as the concave portion includes a sloping or inclined surface.

More specifically, when the profile of the concave portion is defined by a sloping surface, the lubricating oil advancing from the concave portion ascends along such sloping surface and is pushed or forced into the clearance between the clutch plate surfaces, and as a result it is possible to further improve such supplying capacity.

Replenishment of lubricating oil is effected to the concave portions when parts of the clutch plates 5 and 6 are immersed in the lubricating oil at the bottom portion of its differential gear carrier by way of the oil grooves 11 or the clearance between the plates.

Figure 4A:
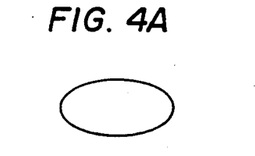
FIGS. 4A-4E are schematic views illustrating other embodiments of concave portions having different profile.
Figure 4B:
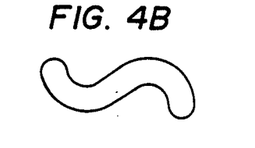
Figure 4C:
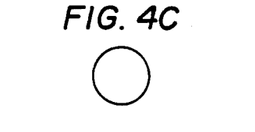
Figures 4D, 4E, 5:
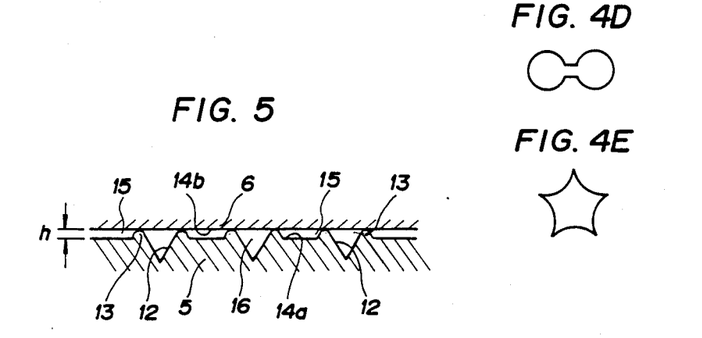
FIG. 5 is an enlarged sectional view showing oil grooves defined in the clutch plate of another embodiment of the limited slip differential gear mechanism according to the present invention.

Next, the second embodiment of the present invention will be described hereinbelow by referring to FIG. 5 together with FIG. 1A, 1B, and 1C. FIG. 5 is an explanatory view of a construction showing oil grooves 12 defined on a clutch plate of the limited slip differential gear mechanism of the second embodiment of the present invention wherein projections 13 are formed along the oil grooves 12. The projections 13 protrude from a clutch plate surface 14a by a prescribed length h in the axial direction (the vertical direction with respect to the clutch plate surface 14a), so that gaps for retaining lubricating oil are formed between these projections 13. Furthermore the oil grooves 12 may be defined on either or both of the surfaces of the clutch plates 5 and 6 which are in contact with each other.

In the above construction, the lower part of the limited slip differential gear mechanism is immersed in lubricating oil in its differential gear carrier at the time when the limited slip differential gear mechanism is not operated, so that such lubricating oil enters into the clearance between the clutch plates 5 and 6 through openings in the differential gear casing as well as gaps defined between the respective parts of the mechanism, and the lubricating oil is supplied onto the surfaces of the clutch plates and into the oil grooves 12. On the other hand, when the limited slip differential gear mechanism is operated, centrifugal force is produced and face to face sliding motion appears in the clearance between the clutch plates 5 and 6, so that such lubricating oil which will form a film on the clutch plates has a tendency to flow out and be scattered. However, the lubricating oil with which the oil grooves 12 are filled is supplied and replenished into the clearance between the clutch plates surface 14a and another clutch plate surface 14b by means of a respiratory function caused between the clutch plate 5 or 6 on which the projections 13 are formed and the surface 14b of the clutch plate 6 or 5 which is in contact with the projections 13 at the time of pressing the clutch plates 5 and 6 toward one another.

More specifically, the surface 14b of the clutch plate 6 or 5 being in contact with the projections 13 repeats elastic deformation at the contacting portions with the projections 13 as fulcra due to an increase or decrease and variation in the pressure to be applied, so that the volume of a clearance 15 between the surfaces 14a and 14b as well as each gap 16 defined between the surface 14b and each inner wall of the oil grooves 12 is made to vary (expand and contract), whereby lubricating oil is supplied by suction. In this case, not only the clutch plate 6, but also the clutch plate 5 exhibits elastic deformation, so that the capacity for supplying lubricating oil due to such respiratory function becomes remarkable. Furthermore, such lubricating oil supplied into the clearance 15 between the surfaces 14a and 14b of the clutch plates 5 and 6 formed together with the projections 13 is extended into every nook and corner by means of capillary action of the clearance 15 to form a film of the lubricating oil.

Moreover it is also possible to arrange that the projection 13 has a higher damping capacity of vibration than that of conventional sliding surfaces. Beside, such vibration generated in the sliding surfaces is buffered by means of the vibration of the projections 13.

In other words, since the construction of the second embodiment involves a vibration damping function, there is obtained the advantage that vibration, due to the stick-slip phenomenon caused by friction between two surfaces of the clutch plates being in contact with each other under pressure, may be prevented.

Replenishment of lubricating oil to the oil grooves 12 is achieved the clutch plate surfaces in the case clutch plates 5 and 6 are immersed in the lubricating oil at the bottom portion of the differential gear carrier by way of openings (windows) in the differential gear casing, gaps between the respective parts of the limited slip differential gear mechanism, and the oil grooves 12 thereof. The retention capacity for lubricating oil in the oil grooves 12 become larger by a volume corresponding to the size of the protruding parts of the projections 13.

Figure 6A:
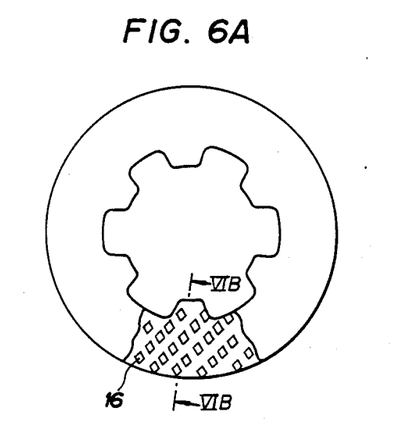
FIG. 6A is an explanatory view showing a clutch plate of another embodiment of the present invention.
Figure 6B:
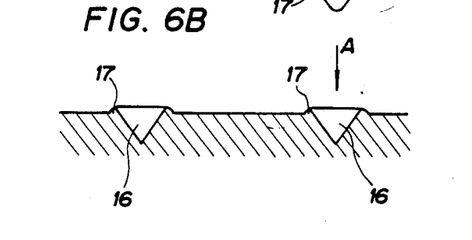
FIG. 6B is an enlarged sectional view taken along line VIB—VIB of FIG. 6A.
Figure 6C:
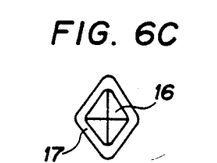
FIG. 6C is a view in the direction of arrow A in FIG. 6B.

FIGS. 6A–6C illustrate another embodiment wherein edge portions of gaps or recesses 16 are made to be protuberant by means of press molding or the like to form projections 17.

Figure 7A:
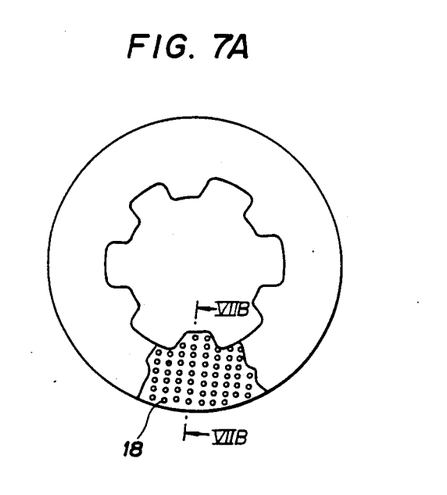
FIG. 7A is a view showing a clutch plate of another embodiment of the present invention.
Figure 7B:
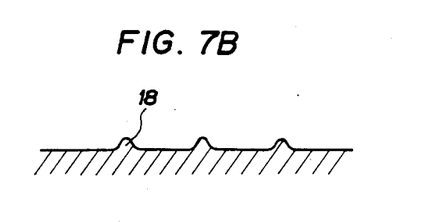
FIG. 7B is an enlarged sectional view taken along line VIIB—VIIB of FIG. 7A.

FIGS. 7A and 7B illustrate still another embodiment wherein projections 18 are formed in relief by means of etching or the like.

It is to be noted that the projections in both the embodiments of FIGS. 6 and 7 have the same functions as those of the projections 13 of the above-mentioned second embodiment illustrated in FIG. 5.

Furthermore it is to be understood that the projection is not limited to the forms illustrated in the above embodiments, but any projection may be used in the present invention so long as it is formed by a relative protrusion from the surface of a one clutch plate.

As described above, gaps for retaining lubricating oil are formed in the clearance between clutch plates which are in contact with each other under pressure, whereby the capacity for retention of lubricating oil as well as the force for supplying lubricating oil to the clearance between the clutch plates in contact with other are increased. Also, a film of lubricating oil is formed in the clearance in accordance with the limited slip differential gear mechanism of the present invention. Thus, vibration due to the stick-slip phenomenon caused by friction between the two surfaces of the clutch plates in contact with each other upon the application therebetween of pressure can be prevented.

Although particular embodiments of the invention have been shown and described, it will occur to those with ordinary skill in the art that other modifications and embodiments exist as will fall within the true spirit and scope of the invention as set forth in the appended claims.

I claim:

1. In a limited slip differential gear mechanism of the type including a pinion shaft rotating integrally with a differential gear casing, pinion gears rotatably attached to said pinion shaft, side gears engaged with said pinion gears and splined to axles, and a plurality of first and second clutch plates alternately disposed between said side gears and said differential gear casing, a lug portion of an inner surface of each said first clutch plate engaging with an outer surface of said side gear, and a lug portion on an outer surface of each said second clutch plate engaging with an inner surface of said differential gear casing, whereby lubricating oil from a reservoir forms lubricating oil films in clearances between confronting surfaces of adjacent said first and second clutch plates, and wherein upon rotation of said clutch plates during use of said mechanism said oil films tend to flow from said clearances due to centrifugal force, the improvement comprising means for retaining the lubricating oil in said clearances and for forcing lubricating oil under pressure into said clearances, said means comprising:

a plurality of concave recesses formed in at least one of said confronting surfaces over substantially the entire said surface, each of said recess having a concave pyramidal configuration defined by planar surfaces converging at an apex.

2. The improvement claimed in claim 1, wherein a plurality of said concave recesses are formed in both of said confronting surfaces.

3. The improvement claimed in claim 1, wherein said one surface has formed therein oil grooves, and each said concave recess has a depth and a width greater than those of said grooves.

4. The improvement claimed in claim 3, wherein each said concave recess is intersected by at least one said groove.

5. The improvement claimed in claim 4, wherein each said concave recess is intersected by plural said grooves.

* * * * *